M. CORRINGTON.
FLUID PRESSURE BRAKE APPARATUS.
APPLICATION FILED SEPT. 16, 1907.

1,110,301.

Patented Sept. 8, 1914.

3 SHEETS—SHEET 1.

M. CORRINGTON.
FLUID PRESSURE BRAKE APPARATUS.
APPLICATION FILED SEPT. 16, 1907.
1,110,301.
Patented Sept. 8, 1914.
3 SHEETS—SHEET 2.
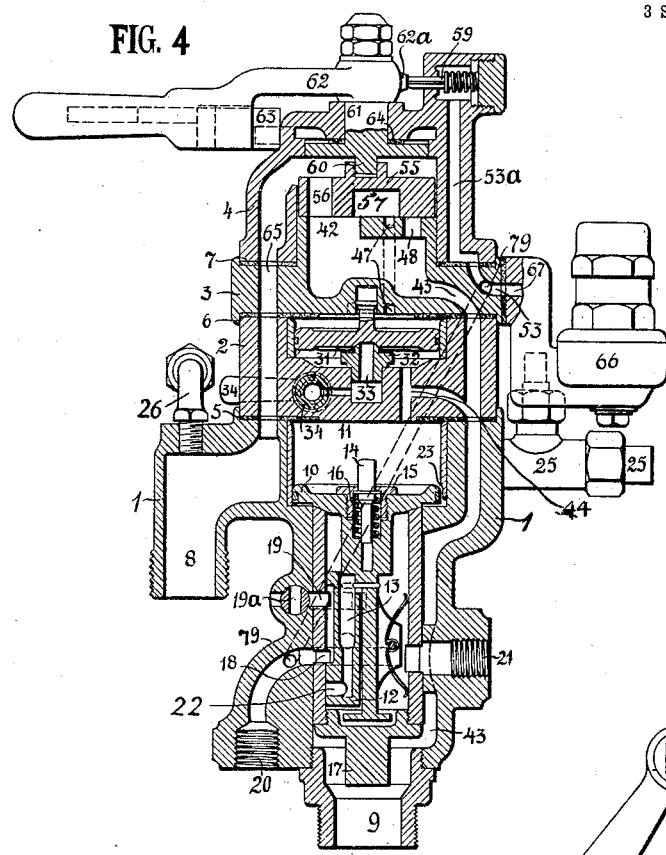
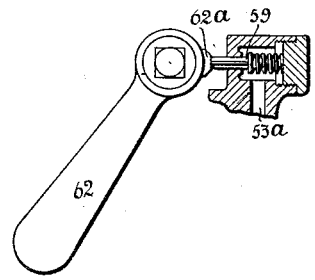
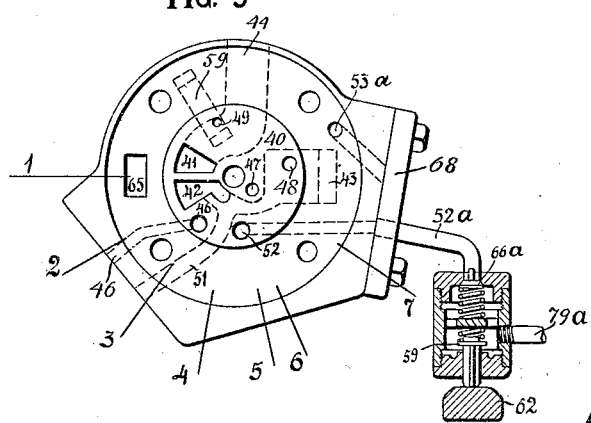
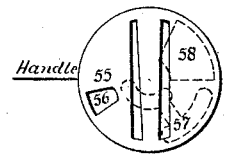

M. CORRINGTON.
FLUID PRESSURE BRAKE APPARATUS.
APPLICATION FILED SEPT. 16, 1907.
1,110,301.
Patented Sept. 8, 1914.
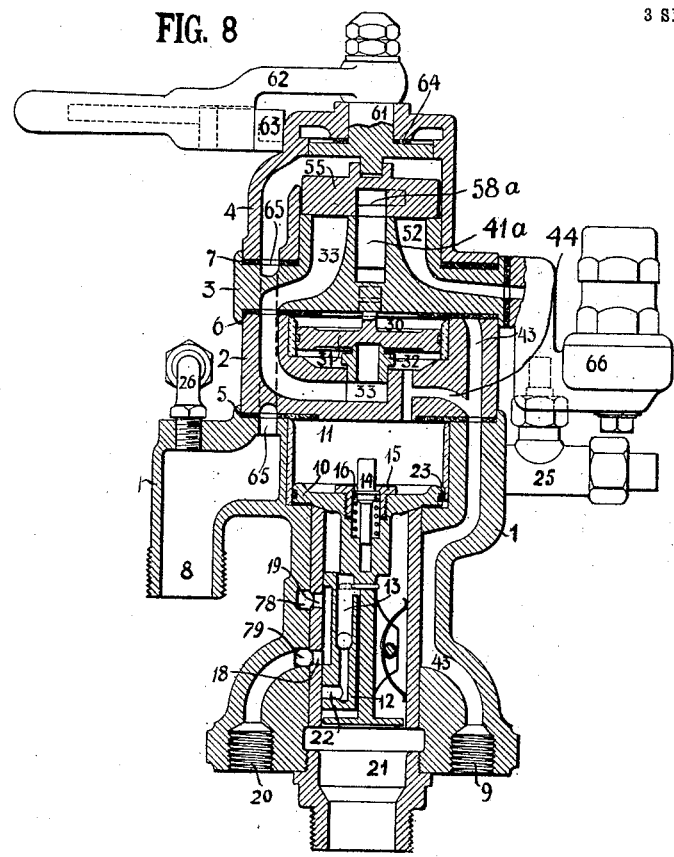
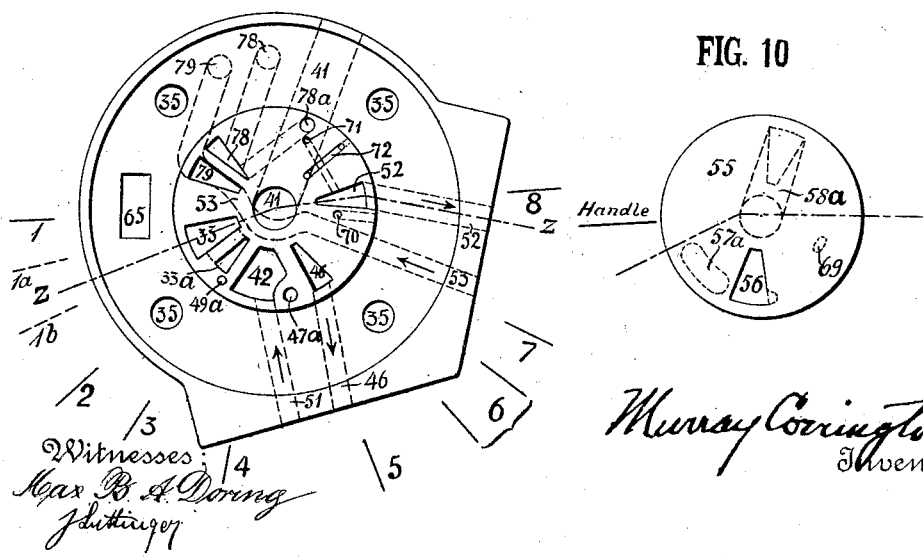

UNITED STATES PATENT OFFICE.

MURRAY CORRINGTON, OF NEW YORK, N. Y., ASSIGNOR, BY MESNE ASSIGNMENTS, TO THE WESTINGHOUSE AIR BRAKE COMPANY, OF PITTSBURGH, PENNSYLVANIA, A CORPORATION OF PENNSYLVANIA.

FLUID-PRESSURE BRAKE APPARATUS.

1,110,301.  Specification of Letters Patent. Patented Sept. 8, 1914.

Application filed September 16, 1907. Serial No. 392,963.

*To all whom it may concern:*

Be it known that I, MURRAY CORRINGTON, a citizen of the United States, residing at New York city, in the county and State of New York, have invented certain new and useful Improvements in Fluid - Pressure Brake Apparatus, of which the following is a specification.

My invention relates to improvements in fluid-pressure brake mechanism, and has for its object more particularly the better control of railway-vehicles by enabling an engineer to hold his train under a more certain and continuous brake control than is feasible with the brake systems heretofore commonly in use.

Figure 1:
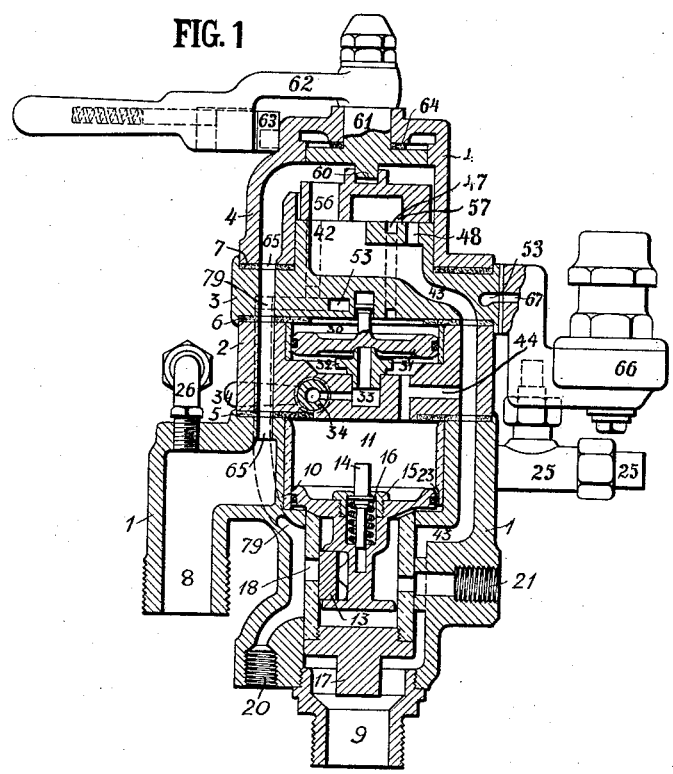
Figure 2:
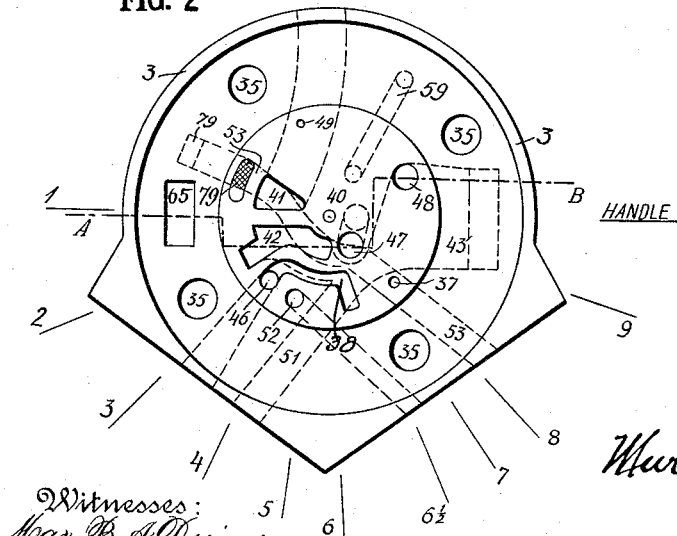
Figure 3:
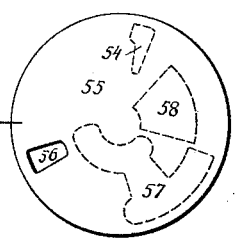

Referring to the drawings. Figure 1 is a vertical section through a valve mechanism embodying my improvements, essentially on the irregular line A B of Fig. 2; Fig. 2 is a top or plan view of casing section 3 and the rotary valve-seat of Fig. 1; Fig. 3 is a top view of the rotary valve which operates on said seat; Fig. 4 is a vertical section of a mechanism similar to Fig. 1, illustrating a modification; Fig. 5 is a plan of a rotary valve seat section to be employed in the apparatus of Fig. 4; Fig. 6 is a plan of a rotary valve which operates upon the valve seat of Fig. 5; Fig. 7 illustrates a detail of Fig. 4; Fig. 8 is a vertical section substantially on the line Z Z of Fig. 9 of a mechanism similar to Figs. 1 and 4, showing a further modification; Fig. 9 is a plan of a rotary valve seat section to be employed in the apparatus of Fig. 8; and Fig. 10 is a plan of a rotary valve operating upon the valve seat of Fig. 9.

Referring to Fig. 1, the general construction consists of casing-sections 1, 2, 3 and 4, with gaskets 5, 6 and 7 interposed between sections 1 and 2, 2 and 3, and 3 and 4, respectively. Section 1 of the casing has a nozzle 8 for connection with the main reservoir or air pump and a hollow cap or plug 9 for connection with the brake pipe of the system. A piston 10 moves in a chamber 11 and operates a valve 13. Within the piston 10 a stem 14 is secured in place by a screw cap 15 and is held in the position shown by the spring 16. A cap 17 closes communication between the chamber in which the piston 10 and valve 13 operate and the train pipe connection 9. The casing 1 has two ports 20 and 21, which are to be connected, respectively, with one or more brake cylinders and one or more reservoirs.

Considering sections 2 and 3, with reference more particularly to Figs. 2 and 3, section 2 embraces a piston-chamber, in which operates a piston 31, whose under side rests normally upon a valve 32, held in fixed relationship to the casing-section and having a port or passage 33 leading to the atmosphere through cock 34, which, when at right angles to the position shown, closes port 33. Section 3 has a seat 40, through which extends a large port 41, leading out to the atmosphere, as shown in dotted lines (Fig. 2) and a large train-pipe port 42, leading to the right and downward, Fig. 1, and thence by passage 43 through casing-sections 2 and 1 and the cap 9 to the train-pipe. A branch passage 44 leads off from 43 and dividing admits train-pipe pressure to the under side of piston 31 and to chamber 11. From the valve-seat 40 port 46 extends downward and to the outer edge of the casing, as seen in dotted lines. A port 47 leads from said valve-seat to the upper end of piston-chamber 30, Fig. 1. A port 48 leads from said seat downward into the train-pipe cavity 42, 43, and a small port 49 leads from said valve-seat into the large exhaust cavity 41. From the side of the casing to which the passage 46 extends a passage 51 leads into the train-pipe cavity 42, 43. All these passages are shown in dotted lines in Fig. 2. A passage 52 leads to the outside of the casing, and from the same side of the casing a passage 53 extends through the casing-section 3 and terminates in the passage 79. A port 37 leads from the valve-seat 40 into the passage 53. A channel or groove 38, preferably of substantially the shape illustrated, is cut in the valve-seat 40 leading into the port 46. The passage 53 extending through the casing passes under the passages 42—43 and ports 41 and 47, as shown in dotted lines, the casing-section being thick enough to permit this arrangement, just as passages 52 and 51 cross each other without communicating, and the ports 41 and 47 running off away from passage 53 as they pass downward through the casing.

Fig. 3 shows the rotary valve 55, which is to be moved to the left and placed in position upon the valve-seat 40, the central hole in the seat 40 accommodating a corresponding pin on the under side of the valve 55, so as to keep it concentric with its seat. Said valve has a port 56 through it, a cavity 57, consisting of connected inner and outer arcs or curved portions, a cavity 58 and a smaller cavity 54 on its under side, as shown in dotted lines. The top of said valve may have the usual slot or mortise, into which a correspondingly-shaped key 60 fits accurately (see Fig. 1) for operating the same. A cavity or passage 59 is cored from the under side of casing-section 3 in such manner that one end of said passage communicates with the upper end of piston-chamber 30, while the other end leads downward through casing-section 2 and communicates with a corresponding passage in casing-section 1 and thence by the pipe or passage 25 to the usual equalizing-reservoir. It is not deemed necesssary to further illustrate said passage 59 than as seen in Fig. 2, since it is a well-known construction familiar to those skilled in the art for keeping the upper end of the equalizing piston-chamber 30 open to an equalizing-reservoir. The pipe 26, Fig. 1, is for the usual gage and governor connection.

Casing-section 4 incloses the rotary valve 55, and through its center a shaft 61 extends, having at its lower portion a key 60 and at its upper end the handle 62 for operating said shaft, and thereby the rotary valve 55, all arranged in the usual manner. A spring-stop 63 is carried by the handle 62 and is arranged to hold the handle in the various positions to which it is moved in operating the valve 55. A gasket 64 prevents air from leaking around the shaft 61. It is to be understood that pressure from the main reservoir or pump flows by the nozzle 8 and the passage 65 and is always present above the valve 55.

Going to Fig. 2, it is to be understood that the passages 46 and 51 are so arranged that a pressure-reducing valve device may be attached to the casing-section, so that fluid under pressure may be admitted into the passage 46, whence it will flow to the outer section of the casing and through the pressure-reducing valve device and thence by the passage 51 into the train-pipe chamber and passage 42, 43. This is for the purpose, known to all skilled in the air-brake art, of keeping the train-pipe pressure regulated at a definite amount even though the pressure in the main reservoir may vary. The passages 52 and 53 in Fig. 2 are arranged for a similar reducing-valve, and ports 46 and 52 are intended to be open to main-reservoir pressure when the valve 55 is turned to such position that the port 56 stands over one of the other of said ports. In Fig. 1 at the right, is shown in outline a pressure-reducing device 66 occupying the proper position for controlling the ports 52 and 53, that section of the device into which the passage 52 would enter, as well as the passage itself, being cut away. It is to be understood that with this pressure-reducing device in position air from the main reservoir or pump going through passage 52 and the reducing device 66 is reduced to a pressure corresponding to the adjustment of the device and thence flows by the passage 67 into the passage 53.

I do not deem it necessary to illustrate or describe more fully a pressure-reducing valve, since it is thoroughly understood in the air-brake art, as well as in mechanics, and it is to be understood that any other suitable device through which fluid under a higher pressure can be delivered into a passage or chamber at such lower pressure as is desired and that lower pressure constantly maintained will answer equally well. The passage 79 into which passage 53 leads goes downward through casing-sections 3, 2 and 1, until it is placed in communication with ports 18 and 20. This can be easily traced in dotted lines in Fig. 1. Suffice it to say that passage 79 may be carried in any convenient manner, preferably through the casing-sections, until it is placed in communication with the passage 20, and it may follow the same course as passage 79 in my Patent No. 762,282.

The operation of the mechanism can now be readily understood. Fluid under pressure from the main reservoir or air-pump being supplied to the nozzle 8 flows upward through passage 65 into the chamber around and above the rotary valve 55. The position of valve 55 in Fig. 1 is what is known as the "release" position, in which pressure from the main reservoir flows downward through port 56 into train-pipe port 42, thence by passage 43 and the train-pipe nozzle 9 to the train-pipe of the brake system and the various triple valves on the cars. This pressure from the train-pipe likewise goes by the passage 44 to the under side of the piston 31, and into the upper end of a piston-chamber 11, where it forces the piston 10 and its connected parts into normal position, (seen in Fig. 1), in which the port 23 is opened, allowing the pressure to go past the piston into the valve-chamber and thence by the passage 21 to charge the auxiliary reservoir connected therewith. At the same time the train-pipe pressure in chamber 42—43 flows into cavity 57, Fig. 1, and thence through 47 to the upper side of the piston 31, thereby keeping said piston normally balanced and held in the position shown in Fig. 1.

The handle 62, which operates the valve 55, has several different positions into which it may be moved, indicated in Fig. 2 from 1 to 9 inclusive. In position No. 1 the port 56 stands over the large train-pipe port 42, which has just been described. In position No. 2 the port 56 stands over the port 46, thus admitting pressure through the passage 46 and its appropriate pressure-reducing valve, thence by the passage 51 into the train-pipe. In position No. 3 the port 56 stands over the port 52, when the pressure flows through the last-mentioned port and the appropriate pressure-reducing valve and thence by the passages 53, 79 and 20 to the cylinder connected therewith. In all three of these positions the train-pipe cavity is kept in communication with the upper end of the piston-chamber 30 by means of ports 42 and 47 and the cavity 57. In position No. 4 the port 56 passes to the right of port 52. In positions No. 5 and No. 6 the small cavity 54 connects ports 79 and 41. In positions 3, 4 and 5 port 56 stands over channel 38 and supplies air to port 46, but not so in position 6; in positions 4, 5 and 6 cavity 57 connects ports 47 and 48, keeping piston 31 balanced; in position No. 6½ port 56 supplies air to port 37 and thence by 53 and 79 to 20; in position No. 7 all ports are closed; in position No. 8 cavity 57 connects ports 47 and 49; and in position No. 9 cavity 58 connects the large ports 41 and 42.

To prepare the system for operation the handle 62 may be moved to position No. 1 admitting pressure through ports 56, 42, 43 &c., to charge the system to the desired amount and release brakes on the train if they are applied; then the valve is moved to position No. 2 the ordinary running position with brakes off, which supplies pressure to the desired amount through the ports 56, 46 and the appropriate regulating device. If it is desired to apply the brakes throughout the train the valve is turned to position No. 8 so as to bring the outer arc of cavity 57 over the preliminary exhaust port 49 while the inner arc of the cavity remains over the port 47, thus releasing through a small port pressure from the upper side of the piston 31 and the equalizing reservoir. Five or ten pounds having been exhausted from the upper side of the piston 31 the brake valve is returned to position No. 7 or "lap," when the train-pipe pressure underneath the piston lifts it from the valve 32 and flows to the atmosphere through the passage 33 until the pressure below the piston is slightly less than that above, when the piston moves down gradually and closes the port 33. This is known as the usual "service" application of the brakes. To set the brakes in emergency, the valve is turned to position No. 9, when the cavity 58 connects the large ports 41 and 42, thus exhausting air rapidly from the train-pipe directly to the atmosphere and causing the emergency operation of the triple valves throughout the train.

Upon the operation of the valve 55 and the equalizing-piston 31 for setting the brakes in service the piston 10 moves upward until the stem 14 strikes the bottom of the casing 2, causing valve 13 to partly uncover port 18 and admit pressure from auxiliary reservoir through ports 18 and 20, to the brake cylinder. In the emergency action the graduating spring 16 yields, permitting piston 10 to move to the upper end of its chamber and draw the valve 13 clear across port 18. If the brakes whose cylinders are connected to the port 20 are to be operated in the usual manner, they may be set with the force desired by the movement of the brake valve handle 62. To release the brakes on the train, air is admitted into the train-pipe, which also moves the piston 10 and valve 12 downward to the position shown, so that the reservoir may be recharged while the engine brakes are held on, and these operations may be repeated, recharging the reservoir, admitting more pressure to the cylinder, and keeping the engine brakes continuously applied as long as desired without releasing, the triples on the cars moving to release meanwhile.

If it is desired to apply brakes on the engine without applying them on the cars, the valve is moved to position No. 3, when the air flows through ports 56, 52, the pressure-reducing device, and thence by passage 53, 79 and 20 to the brake cylinders, the pressure-regulator 66 limiting the amount of the flow, provided the valve is left in that position. When the desired pressure has been admitted to the cylinders, which may be determined by a gage connected therewith, the valve is moved to position No. 4, which shuts off the flow. To reduce pressure in the engine cylinders, the valve is moved to position No. 5, when cavity 54 in the valve face connects ports 79 and 41, thus exhausting pressure from the cylinders through 20, 79, 54 and 41. By operating the valve, therefore, between positions 3, 4 and 5, the pressure in the engine cylinders may be increased, diminished or held constant at will. In all three of these positions the port 56 registers with channel 38 and keeps any leak in the train-pipe throughout the train supplied through the ports 46 and 51, so that the brakes on the cars will not be applied. Again, after the brakes have been set throughout the train, as heretofore explained, the pressure in the engine cylinders may be held constant by keeping the valve in position 7, and any leakage may be supplied, or the pressure in the cylinders increased by moving the valve to position 6½ when the port 56 stands over port 37, or the pressure in the engine cylinders may be released to any extent desired by moving the valve to position No. 6 when the cavity 54 connects ports 79 and 41, while the port 56 stands at the right of channel 38. In both positions 5 and 6 of the valve it will be observed that the cavity 54 connects ports 79 and 41, and releases pressure from the engine cylinders, the difference being that in position 5 air is admitted through 56, 38 and 46 into the train-pipe, which will release the brakes on the train, while in position 6 air is released from the engine cylinders without admitting pressure into the train-pipe. The port 37 may be cored or drilled obliquely into passage 52 instead of 53.

While air may be admitted from main reservoir to the engine cylinders with the valve in position 6½ as above explained, there is still another position in which similar admission of air to engine cylinders may be effected, for, if the ports in valve and valve seat are located in strict accord with the drawings and the valve is turned to position No. 1, or release position, cavity 57 in the valve stands over port 37 in the seat, so that air then flows from main reservoir through ports 56 and 42 into cavity 57 and thence by ports 37, 53, 79 and 20 into the cylinders.

It will be readily observed that the valve structure herein illustrated is particularly adapted to be placed under the immediate care of and operated directly by the engineer, and it is particularly applicable for controlling the brakes on the engine or on both engine and tender. The device herein illustrated may be employed to operate both the engine and tender brakes, or it may be employed to operate the engine-brakes only, allowing the tender brakes to be operated in the usual manner. In any event I prefer that the triples on the cars shall be connected to the train-pipe by the usual branch-pipe connections in the ordinary manner, though it is evident that the cylinders of one or more cars may be connected to port 20 as described above with reference to the tender.

From the above description of the operation of the apparatus it is evident that I may operate the mechanism so that the brakes on the engine may be released at the time the brakes on the cars are released for recharging the reservoirs or the brakes on the cars may be released for recharging while the brakes on the engine are held applied, after which the engine brakes may be released independently. This is all accomplished by the movement of the handle 62. By moving the handle 62 between the positions 3, 4 and 5 or between positions 6, 6½ and 7 the pressure may be admitted to and released from the brake-cylinders or held at any pressure desired from one pound up to the full maximum permitted by the reducing-valve 66. In case of leaks from the engine-cylinders the pressure can be fully restored by moving the valve 62 as above explained. With my apparatus herein described on the second of two engines, the brakes on the train being controlled from the head-engine, the handle 62 is placed on position No. 7 and the cock 34 turned to close port 33.

In the mechanism illustrated the arrangement of the parts is such that whenever the valve-handle 62 is operated for automatic application of the brakes the piston 10 and valves operated thereby are shifted to the position for opening the port 18, and consequently the engine-brakes will always be applied on each reduction of pressure in the train pipe, and hence any accidental bursting of the train-pipe or breaking in two of the train will certainly apply the brakes throughout the train, which may by many be considered an advantage. With the apparatus operating in this manner in order to set in motion the alternate system of application and release between engine and cars above described the engineer first applies brakes through the train by operating the handle 62 between positions 7 and 8, then operates the handle 62 to position 6 and holds engine-brakes at release until the time arrives for releasing and recharging on the cars, when he applies on the engine by moving handle 62 to position No. 3, or to No. 1 and then back to No. 3 and releases on the cars, &c Going now to Figs. 4 to 7 inclusive, there is seen the same general arrangement as that already described of a modified apparatus. The casing sections 1, 2, 3, 4 with gaskets 5, 6 and 7 and pipe connections 8, 9, 20, 21, 25, and 26 are substantially the same as in Fig. 1. In casing section 1 piston 10, main valve 12 and graduating valve 13 operate like a plain triple valve. Pressure is charged from train line through passage 44, chamber 11, charging groove 23 into auxiliary reservoir connected at 21, and by reduction of train line pressure reservoir pressure flows through passage 18—20 to the brake cylinder to apply brakes in the usual manner. The exhaust port 19 may be controlled by a cock 19ª and, when it is open, the triple valve will release cylinder pressure to the atmosphere in the usual manner. The piston 31, valve 32, train-pipe vent port 33 and cock 34 operate in the manner already described. A passage 53ª leads up to the top of casing section 4 where it opens to the atmosphere through a port controlled by a valve 59. Passage 79 connects passages 53 and 20 in any convenient manner.

Supposing that pressure reducing or feed valve 66 of Fig. 4 is connected to Fig. 5 instead of the plate or disk 68 and the parts attached thereto, and that the rotary valve of Fig. 6 is placed upon the seat 40 of Fig. 5, the operation is as follows: When the handle of valve 55 is in position No. 1 or release, port 56 stands over train-pipe port 42 admitting pressure thereby to train line.

In position 2, or running position, port 56 stands over feed port 46, admitting pressure through 46, the feed valve connected therewith and port 51 to train line. In position No. 3 port 56 in the valve stands between ports 46 and 52. In position No. 4 port 56 stands over 52 and admits pressure through 52, reducing valve 66 and ports and passages 67, 53, 79 and 20 to the cylinder connected with port 20. In positions 2, 3, and 4 ports 47 and 48 are in communication through cavity 57 and the pressures above and below 31 are the same. In positions 5, 6, and 7 the valve 55 performs the usual functions of a brake valve in lap, service and emergency positions already described in connection with Figs. 1 to 3 above. Valve 55 is operated by means of handle 62 and shaft 61 in the usual manner. Any pressure admitted to the brake cylinders fills passages 79 and 53$^a$ and acts against valve 59. In Fig. 4, in which valve 55 is supposed to be in release position, valve 59 is opened by a cam or lug 62$^a$ on handle 62, and in such construction engine brakes are released through 20, 79, 53$^a$ and valve 59 while car brakes are released. I prefer, however, to place the cam 62$^a$ on handle 62 in such position that valve 59 is opened while the handle is in position No. 3, as seen in Fig. 7 and closed at other times. In this latter construction the usual positions of valve 55—62 then become, 1, release, car brakes off, engine brakes on, if applied. 2. Running, train line feed, car brakes off, engine brakes on, if applied. 3. Engine brakes release through valve 59, car brakes on or off. 4. Straight air apply on engine. 5. Lap. 6. Service. 7. Emergency. If car brakes are applied, engine brakes may be graduated on or off by straight air at will, by moving the valve between positions 3, 4 and 5. If car brakes are released, engine brakes may be graduated on or off at will by moving the valve either between positions 3, 4 and 5 or between positions 2, 3 and 4. Two cams 62$^a$ may be employed, if desired, one as in Fig. 4, and the other as in Fig. 7. If now feed valve 66 be removed and plate 68 and its connected parts bolted on to Fig. 5, the same operations and results may be effected. In position 4 port 56 stands over port 52 and pressure flows to the engine cylinders through 52, 52$^a$, past pressure reducing valve 66$^a$ and thence by passage 79$^a$ to the brake cylinders. To release engine brakes valve 59 is placed in such position above the path of handle 62 that said handle may pass under and open the valve when it occupies position No. 3, as seen in Fig. 5; but the valve remains closed at other times. As described above, port 56 does not admit pressure into feed port 46 while releasing engine brakes. I have found it a very easy matter in practice to so arrange valve 59 with reference to the movements of handle 62 that said valve may be opened either while wholly closing feed port 46 or while partially opening said port and admitting pressure to said port to feed train pipe, and preventing brakes from "sneaking" on through train line leaks. Valve 59 is closed when valve 55 is moved to position No. 2. A handle 62 may be employed without the lug 62$^a$ or the stem of valve 59 may be shortened so that it may remain closed and cock 19$^a$ may be opened and the apparatus operated as a brake valve, triple valve, &c., and also to apply straight air on engine. In double-heading with the apparatus of Fig. 4 on the second engine, valve 55 is placed on lap position 5, cock 34 is closed and cock 19$^a$ is opened. But by operating the apparatus as above described, we shall have a straight air and an automatic brake on the engine independent of each other and shall be able to alternate brakes between engine and cars without impairing the efficiency of either. The valve and valve seat of Figs. 5 and 6 are substantially the valve and valve seat of Figs. 10 and 11 of my prior Patent No. 729,044 issued May 26th, 1903, except that feed port 33 of that patent has been abandoned and feed port 43 has been converted into the straight air port 52.

In Figs. 8, 9 and 10 are shown further modifications. The casing sections and interposed gaskets, triple valve 10, 12 and 13, the equalizing piston 31, rotary valve 55 and handle 62 are arranged similarly to those of the other figures. The train line service vent 33, instead of going to the atmosphere directly goes up to the seat of the brake valve. The seat of the brake valve Fig. 9, has, in its center, exhaust port 41 which goes downward and curves outward to the atmosphere, large train line port 42 which leads to train line through passages 43 and 9, ports 47$^a$ and 49$^a$ which lead to the top of equalizing piston chamber 30, feed port 46 which leads to train line through a suitable feed or reducing valve, service vent port 33 and branch 33$^a$ thereof, port 78 which leads down preferably through the casings to the triple exhaust port 19, port 79 which leads down preferably through the casings to the cylinder passage 20, and straight air port 52 which leads to a suitable reducing valve 66, Fig. 8, and thence by passages 53 and 79 to cylinder passage 20. The valve 55 has a port 56 through it and cavities 57$^a$ and 58$^a$ on its face. Ports 70, 71 and 72 and 78$^a$ in the valve seat and cavity 69 in the valve will presently be described.

If the valve of Fig. 10 is moved to the left and put in position on Fig. 9 so that the handle falls in position 1, port 56 in the valve stands over train line port 42 and admits pressure in large volume to train line, moving all triples to release. At the same time the right hand corner of port 56 stands over port 47ª charging the equalizing reservoir and the top of piston chamber 30. Moving the valve to position 2, the right hand side of port 56 stands over feed port 46 when pressure flows through 46, the appropriate reducing valve and thence by passage 51 to 42 and the train line, as indicated by the arrows. Meanwhile, exhaust cavity 58ª which is made up of a circular port in the valve center, a nearly V shaped port at the edge of the valve and a cored passage connecting them, comes near to triple exhaust port 78 but does not open it. When the valve is moved to position 3, port 56 still stands over feed port 46 and cavity 58ª now opens exhaust port 78. In position 4 of the valve, feed port 46 is closed and cavity 58ª opens 79 to the atmosphere which we may call straight air release. In positions 2, 3 and 4 cavity 57ª in the valve keeps port 47ª open either to port 42 or port 46, so that equality of pressure above and below piston 31 is maintained. In position 5 port 56 stands over port 52 when pressure flows through 52, reducing valve 66 and thence by passages 53 and 79 to engine cylinders. Position 6 is "lap" position and it is a wide or variable position. In position 7, or service position, cavity 58ª opens port 49ª from the top of equalizing piston 30 to port 41, causing the piston to lift from valve 32 and open train line vent port 33. In service position of the valve cavity 58ª opens both ports 49ª and 33ª to exhaust and hence a full service application of brakes may be had by holding the valve in position 7. In ordinary applications the valve is held in position 7 until the pressure above piston 31 is reduced 6 or 8 pounds when the valve is returned to the right hand side of lap position 6, in which movement cavity 58ª gradually closes port 33ª but opens about one-third or one-half of port 33 in the valve seat, which is the largest port that it is safe to open without risk of causing emergency action of the brakes. The end of port 33 which is opened by the lifting of piston 31 is as large as the full size port 33 in the valve seat, and, if opened fully in the first instance, would cause emergency action of the triples. If the brake valve is first operated as above described, allowing piston 31 to open port 33 fully while port 33 in the valve seat is only partly opened, or port 33 in the seat is closed and port 33ª is opened, the train line pressure will be set in motion toward the engine and the valve may then be moved more or less slowly from the right hand to the left hand side of position 6, allowing cavity 58ª in the valve to increase the opening of port 33 in the valve seat until it is fully opened without causing emergency action. This enables the engineer to greatly increase the train line reductions and hasten the service applications particularly on long trains. With port 33 opened fully by piston 31 the venting of pressure from train line may be varied more or less by moving the valve so as to control port 33 in the valve seat. When the train line pressure falls below that to which the pressure above the piston 31 may have been reduced, the piston moves down and closes port 33. When the valve is moved to position 8, cavity 58ª connects ports 42 and 41 causing emergency operation of all triples on the train. The several positions of the valve and results accomplished may be defined as follows: 1. Release, car brakes released, engine brakes held on if applied. 2. Running, train line feed and release of car brakes, engine brakes held on if applied. 3. Running, train line feed, all brakes released. 4. Straight air release on engine, car brakes not affected. 5. Straight air brakes applied on engine, car brakes not affected. 6. Lap, varying of train line exhaust for service. 7. Service, all brakes applied by automatic. 8. Emergency for all brakes. It will be noticed that in Fig. 9, pressure flows through passages 46 and 51 and through passages 52 and 53 and the appropriate reducing valves in a direction opposite to that in Figs. 2 and 5.

Additional ports may be employed with additional results. Port 78ª communicating with passage 78 may be opened by cavity 58ª when the valve is in release, so that engine brakes may release gradually through the engine triple and exhaust passage 78, 78ª and cavity 58ª. By moving the valve to position designated 1ª, port 78ª is closed and release of engine brakes is arrested. By moving the valve handle between positions 1 and 1ª, the engine brakes may be released gradually step by step or release arrested all the while charging pressure through 56 and 42 to train line. Port 70 in the valve seat communicating with the main reservoir air surrounding the rotary valve and seat may be located so that a cavity 69 may connect it with straight air passage 52 when the valve handle is in position 1ᵇ. By moving the valve between positions 1, 1ª and 1ᵇ, the engineer may gradually reduce or increase or hold constant the engine cylinder pressure while charging the train line and releasing car brakes. Port 71 in the valve seat may be employed to release pressure from the engine cylinders from passage 52 while the valve is in position 1. And this port may also be employed if properly located so that port 56 will admit pressure into it and thence through 52 to the engine cylinders when the valve is moved to emergency. The groove 72 may be employed for oiling the face of the valve. Some oil being poured into the casing around the valve seat is forced by air pressure up into this groove and lubricates the valve and its seat.

I claim:

1. In a fluid pressure brake system the combination, with an automatic train pipe line a triple valve, an auxiliary reservoir and a cylinder containing a piston whose movements cause brakes to be applied and released on an engine, of an automatic brake valve controlling passages leading, respectively, to the train line, to the exhaust port of said engine triple valve and to said engine cylinder and capable in one position of opening the passage to the train line, in another position of opening passages to the train line and to the triple valve exhaust port and in a third position of admitting pressure through said engine cylinder passage to said cylinder.

2. In a fluid pressure brake system, the combination, with an automatic train pipe line a triple valve, an auxiliary reservoir and a cylinder containing a piston for applying and releasing brakes on an engine, of an automatic brake valve controlling independent passages leading, respectively, to the exhaust port of said engine triple valve and to said engine cylinder and capable of opening said passages in different positions and releasing engine brakes either directly or through the engine triple exhaust port.

3. In a fluid pressure brake system, the combination, with an automatic train pipe line a triple valve an auxiliary reservoir and a cylinder containing a piston for causing application and release of brakes on an engine, of an automatic brake valve controlling independent passages leading, respectively, to the exhaust port of said engine triple valve and to said cylinder and capable of releasing engine brakes either directly or through the triple exhaust passage, and of admitting pressure to said cylinder in another position.

4. The combination on an engine of a triple valve and an automatic brake valve capable of movement to three positions, in one of which pressure is admitted directly to a cylinder containing a piston for applying and releasing brakes, in another of which pressure is released directly from said cylinder and in the third of which pressure is released from said cylinder through the exhaust port of the engine triple valve.

5. The combination, with a train line and an automatic brake valve having an equalizing piston, of ports leading, respectively, to said piston and to said train line and a single port in the valve for venting pressure from said piston and from said train line in different positions of the valve.

6. In an automatic air brake system, the combination with a train pipe, of a brake valve having an equalizing piston and valve for controlling the discharge from the train pipe in service applications, said brake valve also having means for controlling the preliminary discharge from the equalizing chamber and for varying the size of the outlet from the equalizing discharge valve to the atmosphere in different positions of the valve.

7. In an automatic air brake system, the combination with a train pipe, of a brake valve having an equalizing piston subject to the opposing pressures of the train pipe and an equalizing chamber, and a train pipe discharge valve actuated by said piston, said brake valve having ports for controlling the capacity of the outlet from the train pipe discharge valve.

MURRAY CORRINGTON.

Witnesses:
  MALCOLM N. BUTLER,
  WILLIAM EARL LAWTHER.

---

Copies of this patent may be obtained for five cents each, by addressing the "Commissioner of Patents, Washington, D. C."